United States Patent [19]
Dickerson

[11] Patent Number: 5,535,933
[45] Date of Patent: Jul. 16, 1996

[54] GLASS CUTTING MACHINE

[76] Inventor: Robert L. Dickerson, 1875 SE. N St., Grants Pass, Oreg. 97526

[21] Appl. No.: 503,640

[22] Filed: Jul. 18, 1995

[51] Int. Cl.$^6$ .................................................. C03B 33/10
[52] U.S. Cl. .......................................... 225/96.5; 225/103
[58] Field of Search ............................ 225/96.5, 96, 103, 225/5; 83/886

[56] References Cited

U.S. PATENT DOCUMENTS

| | | | |
|---|---|---|---|
| 2,051,698 | 8/1936 | Gaskell | 225/96.5 |
| 3,216,635 | 11/1965 | Lefevre . | |
| 3,279,664 | 10/1966 | Lynch | 225/96.5 |
| 3,600,992 | 8/1971 | Dryon . | |
| 3,703,115 | 11/1972 | Nagae et al. . | |
| 3,881,618 | 5/1975 | Tausheck . | |
| 4,018,372 | 4/1977 | Insolio . | |
| 4,171,657 | 10/1979 | Halberschmidt et al. . | |
| 4,296,662 | 10/1981 | Reed et al. . | |
| 4,667,555 | 5/1987 | Lisec . | |
| 5,165,585 | 11/1992 | Lisec . | |

FOREIGN PATENT DOCUMENTS

| | | | |
|---|---|---|---|
| 668633 | 8/1963 | Canada . | |
| 1139718 | 2/1985 | U.S.S.R. | 83/886 |

Primary Examiner—Kenneth E. Peterson
Assistant Examiner—Sean A. Pryor
Attorney, Agent, or Firm—Richard C. Litman

[57] ABSTRACT

A glass cutting machine including a frame, a cutter assembly supported by the frame, and a cam activated breaking mechanism. The cutter assembly includes a guide bar for supporting a sliding cutting attachment. The cutting attachment is positioned in a first orientation when sliding in a first direction and a second orientation when sliding in a second direction. A glass cutter, attached to the cutting attachment, cuts the glass workpiece when the cutting attachment is positioned in the first orientation and is spaced from the glass workpiece when the cutting attachment is positioned in the second orientation. Thus, cutting occurs only when the cutter assembly slides in the first direction. A cam activates a breaking mechanism as the cutting attachment slides in the second direction. The breaking mechanism impacts the glass workpiece to complete separation of the glass workpiece into a first glass section and a second glass section.

20 Claims, 4 Drawing Sheets

GLASS CUTTING MACHINE

BACKGROUND OF THE INVENTION

1. Field of the Invention

The present invention relates to machinery for scoring and breaking sheets of glass into multiple sections.

2. Description of the Prior Art

The cutting of glass sheets into multiple sections using the conventional two-step score and break method is traditionally accomplished using one of two types of glass cutting machines. With the first type, typically referred to a glass cutting table or an X-Y cutter, the glass sheet is fastened to a cutter surface and a cutting tool travels along the surface of the glass to score the glass into predetermined shapes while the glass sheet remains stationary. Examples of glass cutting tables U.S. Pat. No. 3,881,618, issued to Russell W. Tausheck on May 6, 1975, and U.S. Pat. No. 4,667,555, issued to Peter Lisec on May 26, 1987. A glass cutting table is particularly suited for cutting the glass into irregular or non-uniform forms or shapes.

With the second type of glass cutting machine, the glass is conveyed along a conveyor belt or similar assembly to a scoring station where the glass is scored along a predetermined line. Scoring is typically performed by a cutting tool suspended above the glass which acts to score the glass while the glass is held momentarily stationary beneath the scoring station. After scoring the glass is conveyed away from the scoring station. Examples of such glass cutting machines may be seen in the following patent documents: U.S. Pat. No. 3,216,635, issued to Michel Lefevre on Nov. 9, 1965; U.S. Pat. No. 3,600,992, issued to Jacques Max Dryon on Aug. 24, 1971; U.S. Pat. No. 3,703,115, issued to Yasuyuki Nagae et al. on Nov. 21, 1972; U.S. Pat. No. 4,018,372, issued to Thomas A. Insolio on Apr. 19, 1977; U.S. Pat. No. 4,171,657, issued to Friedrich Halberschmidt et al. on Oct. 23, 1979; U.S. Pat. No. 4,296,662, issued to Ronald R. Reed et al. on Oct. 27, 1981; U.S. Pat. No. 5,165,585, issued to Peter Lisec on Nov. 24, 1992; and Canadian Patent No. 668,633 issued to Edgard Brichard et al. on Aug. 13, 1962.

With both types of glass cutting machines the scoring and breaking steps are performed separately. Often, the breaking step is performed by a separate machine or even by hand. Consequently, when glass is required to be cut into a large volume of uniform rectangular sheets for use in mass production, high speed production and preciseness can not be achieved using the conventional glass cutting machines described above. Also, conventional glass cutting machines often use complex automatic control systems, such as the system described in U.S. Pat. No. 3,703,115, to electrically control the mechanical components of the machine. This results in increased construction and repair costs for the machines. There is a need for a technically simple glass cutting machine capable of cutting glass into uniform rectangular sections with preciseness and at a high rate of speed. None of the above inventions and patents, taken either singly or in combination, is seen to describe the instant invention as claimed.

SUMMARY OF THE INVENTION

The present invention is directed to an apparatus for cutting a glass sheet into multiple glass sections. In accordance with one aspect of the invention, the glass cutting apparatus comprises a frame, a cutter assembly supported by the frame, and a cam activated breaking mechanism. The cutter assembly includes an input for receiving a glass workpiece, guide means mounted on the frame, a cutting attachment supported by the guide means, and a glass cutter. The cutting attachment slides on the guide means in a first direction and a second direction. When sliding in the first direction, the cutting attachment is positioned in a first orientation such that the glass cutter engages the glass workpiece. When sliding in the second direction, the cutting attachment is positioned in a second orientation such that the glass cutter is spaced from the glass workpiece. Thus, the glass cutter cuts the glass workpiece when the cutting attachment slides in the first direction. A drive means is provided for sliding the cutting attachment. A cam is mounted on the drive means and activates the breaking mechanism as the cutting attachment slides in the second direction. When engaged by the cam, the breaking mechanism moves to a first position to impact the glass workpiece. Thus, complete separation of the glass workpiece into a first glass section and a second glass section is effected.

In accordance with one aspect of the invention, a feed assembly, communicating with the input of the cutter assembly, may also be provided. The feed assembly continuously conveys the glass workpiece along a path beneath the cutter assembly and supports the glass workpiece at the cutter assembly.

In accordance with another aspect of the invention, the feed assembly may include an axle mounted to the frame, a feed roll for supporting the glass workpiece, and a first motor for rotating the feed axle. The feed roller is supported by and rotates with the axle. Rotation of the feed roller continuously conveys the glass workpiece beneath the cutter assembly.

In accordance with a further aspect of the invention, a stop mechanism may be provided for attachment to the cutter assembly. The stop mechanism stops the glass workpiece after the glass workpiece has been conveyed by the feed assembly a predetermined distance beneath the cutter assembly. In addition, the stop mechanism holds the glass workpiece in a stationary position beneath the cutter assembly as the cutting attachment slides in the first direction and the glass cutter cuts the glass workpiece.

In accordance with one aspect of the invention, the cutter assembly may be provided with a slide bar. The slide bar slides along the guide means in the first and the second direction. The cutting attachment is pivotally connected to the slide bar and pivots between the first orientation and the second orientation. The cutting attachment pivots to the first orientation when the slide bar slides in the first direction and pivots to the second orientation when the slide bar slides in the second direction. Thus, the glass cutter cuts the glass workpiece only when the slide bar slides in the first direction.

In accordance with one aspect of the invention, the drive means may comprise of a motor having a rotating first pulley, a second pulley connected by a belt to the first pulley, a drive rod connected to the second pulley, and a drive arm linking the drive rod to the slide bar. The drive rod includes a first end connected to the second pulley and a second end pivotally connected to the first end of the drive arm. Rotation of the second pulley causes the second end of the drive rod to rotate about the first end of the drive rod. The second end of the drive arm is pivotally connected to the slide bar such that rotation of the second end of the drive rod causes the drive arm to slide the slide bar in the first direction and the second direction.

In accordance with another aspect of the invention, the drive means may also include a link connecting the drive arm to the cutting attachment. The link causes the cutting attachment to pivot to the first orientation when the slide bar moves in the first direction and causes the cutting attachment to pivot to the second orientation when the slide bar moves in the second direction.

In accordance with still a further aspect of the invention, the link may also include a slot having a first end and a second end and the drive arm may also include a pin sized to engage the slot. The pin engages the first end of the slot when the slide bar slides in the first direction and engages the second end of the slot when the slide bar slides in the second direction.

In accordance with still a further aspect of the invention, a biasing means, such as a spring, is provided for biasing the cutting attachment in the second orientation.

In accordance with one aspect of the invention, the breaking mechanism may comprise a rocker arm, a push rod, and a breaker foot. The cam engages the first end of the rocker arm and pivots the rocker arm between the first and second positions. The push rod extends from the second end of the rocker arm to the breaker foot. The breaker foot impacts the glass workpiece when the rocker arm is in the first position thereby completing separation of the glass workpiece into a first glass section and a second glass section.

In accordance with one aspect of the invention, the guide means may comprise of two parallel guide rods.

In accordance with another aspect of the invention, the slide bar may be in the form of a rectangular block having two parallel apertures formed completely therethrough. Each of the apertures is sized to engage a respective one of the two parallel guide rods.

In accordance with a further aspect of the invention, the output assembly may comprise a drive axle mounted to the frame, a drive roller rotatably mounted on the drive axle, a conveyor belt rotated by the drive roller, and a second motor for rotating the drive roller. The conveyor belt supports glass sections of the glass workpiece after the glass sections are completely separated from the glass workpiece by the breaking mechanism. The continuous rotation of the conveyor belt continuously conveys the glass sections from the cutter assembly.

In accordance with another aspect of the invention, the drive roller of the output assembly may be rotated by the first motor.

In accordance with a further aspect of the invention, the output assembly may also include speed reduction means for reducing the rotation speed of the conveyor belt to one-half of the rotation speed of the feed roller of the feed assembly.

Accordingly, it is a principal object of the invention to provide a glass cutting apparatus that permits the rapid cutting and breaking of a glass workpiece into multiple glass sections.

It is another object of the invention to provide a glass cutting apparatus that permits the precise cutting and breaking of a glass workpiece into multiple uniform glass sections.

It is a further object of the invention to provide a technically uncomplicated and inexpensive glass cutting apparatus that permits the rapid cutting and breaking of a glass workpiece into multiple uniform glass sections.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
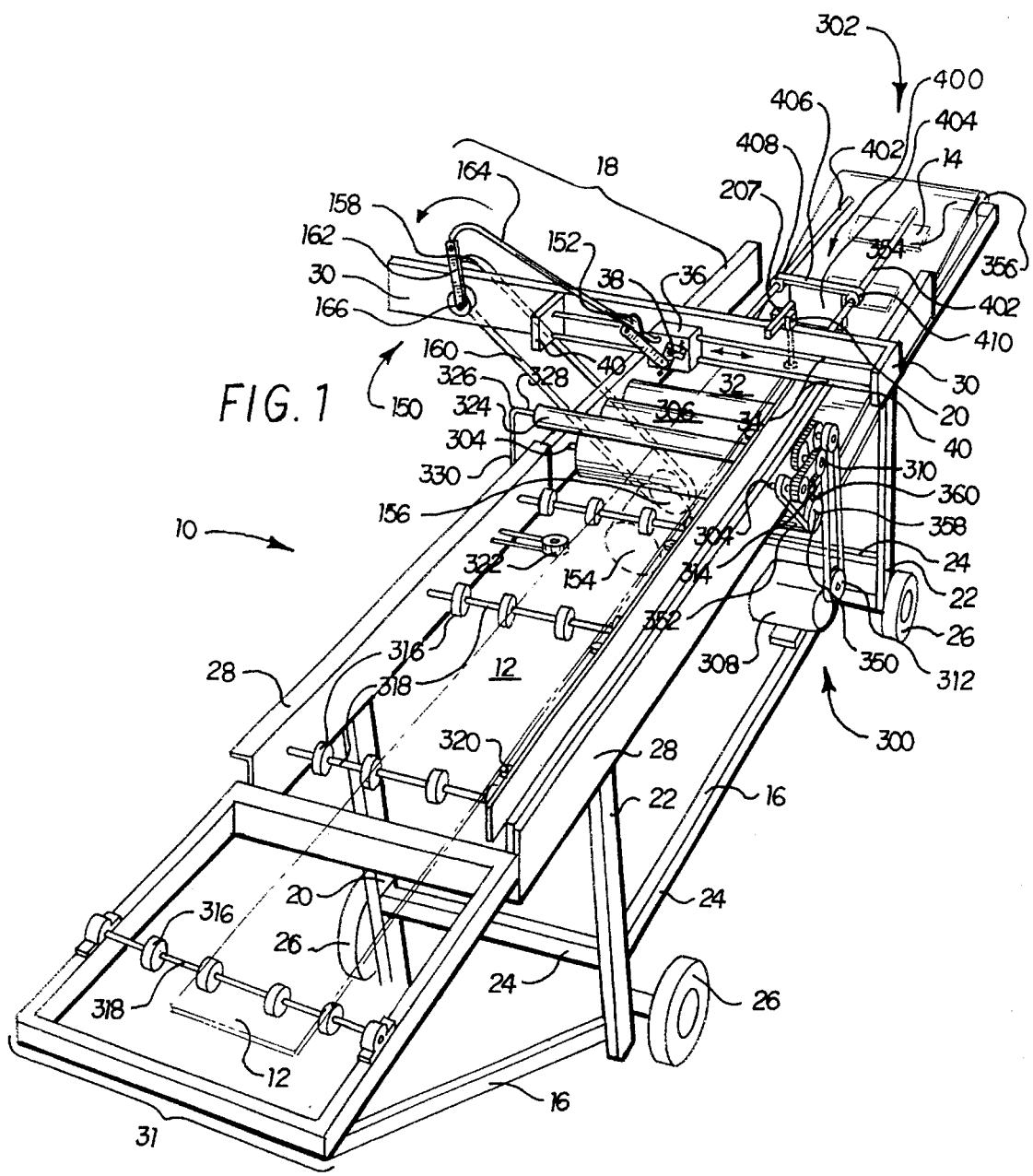
FIG. 1 is a perspective view of the present invention, showing a glass workpiece positioned on the feed assembly of the present invention.

A glass cutting apparatus 10 for rapidly cutting a glass workpiece 12 into multiple uniform glass sections 14 is shown in FIG. 1. The main components of the glass cutting apparatus include a frame 16, a cutter assembly 18, and a breaking mechanism 20.

In order to provide stability and structural support for the glass cutting apparatus 10, the frame 16 is constructed in the form of a cart having four vertical support members 22 and four horizontal support members 24. A horizontal support member 24 extends perpendicularly between each of the vertical support members 22 such that the horizontal support members 24 form a rectangular support at the base of the glass cutting apparatus 10. Wheels 26 are provided at the base of each of the four vertical support members 26 to provide for portability of the glass cutting apparatus 10. Two parallel, horizontally disposed, lateral support beams 28 form the top surface of the frame 16 and are supported by each of the vertical support members 22. A cross beam 30 extends perpendicularly across the top surface of the frame 16 and rests upon the support beams 28. The cross beam 30 provides support for the cutter assembly 18 and the breaking mechanism 20.

Figure 2:
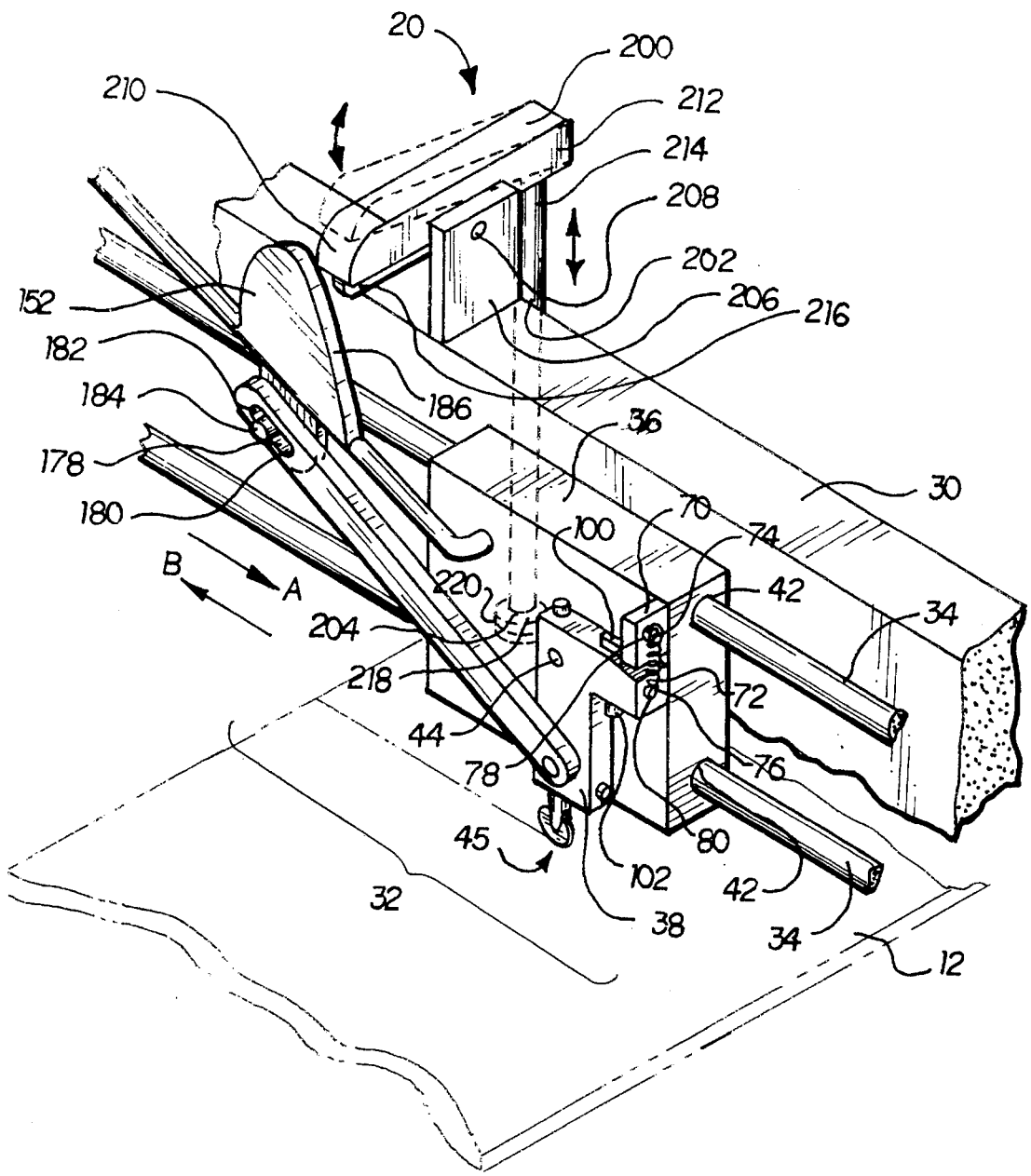
FIG. 2 is a perspective view of the cutter assembly and the breaker mechanism of the present invention.

Referring to FIGS. 1 and 2, the cutter assembly 18 includes an input 32 for receiving the glass workpiece 12, two parallel guide rods 34 mounted on the cross beam 30, a slide bar 36 supported by the guide rods 34, and a cutting attachment 38 pivotally attached to the slide bar 36. Two support plates 40 extend perpendicularly from the cross beam 30. The guide rods 34 extend between the two plates 40 such that the guides rods 34 are positioned parallel to the cross beam 30. The slide bar 36 is constructed in the form of a rectangular block having two parallel apertures 42 formed completely therethrough. Each of the apertures 42 is sized to engage a respective one of the two parallel guide rods 34. The slide bar 36 slides along the guide rods 34 in a first direction, indicated by arrow A on FIG. 2, and a second direction, indicated by arrow B on FIG. 2.

Specifically referring to FIG. 2, the cutting attachment 38 is pivotally connected to the slide bar 36 by pivot pin 44 and pivots between a first orientation and a second orientation. The cutting attachment 38 is shown pivoted to the first orientation in FIG. 2. A glass cutter 45 extends from the bottom surface of the cutting attachment 38. In the first orientation, the glass cutter 45 engages the surface of the glass workpiece 10. In the second orientation, the glass cutter 45 is spaced from the glass workpiece 12. The cutting attachment 38 pivots to the first orientation when the slide bar 36 slides in the first direction and pivots to the second orientation when the slide bar 36 slides in the second direction. Thus, the glass cutter 45 cuts the glass workpiece 12 only when the slide bar 36 slides in the first direction.

Figure 4:
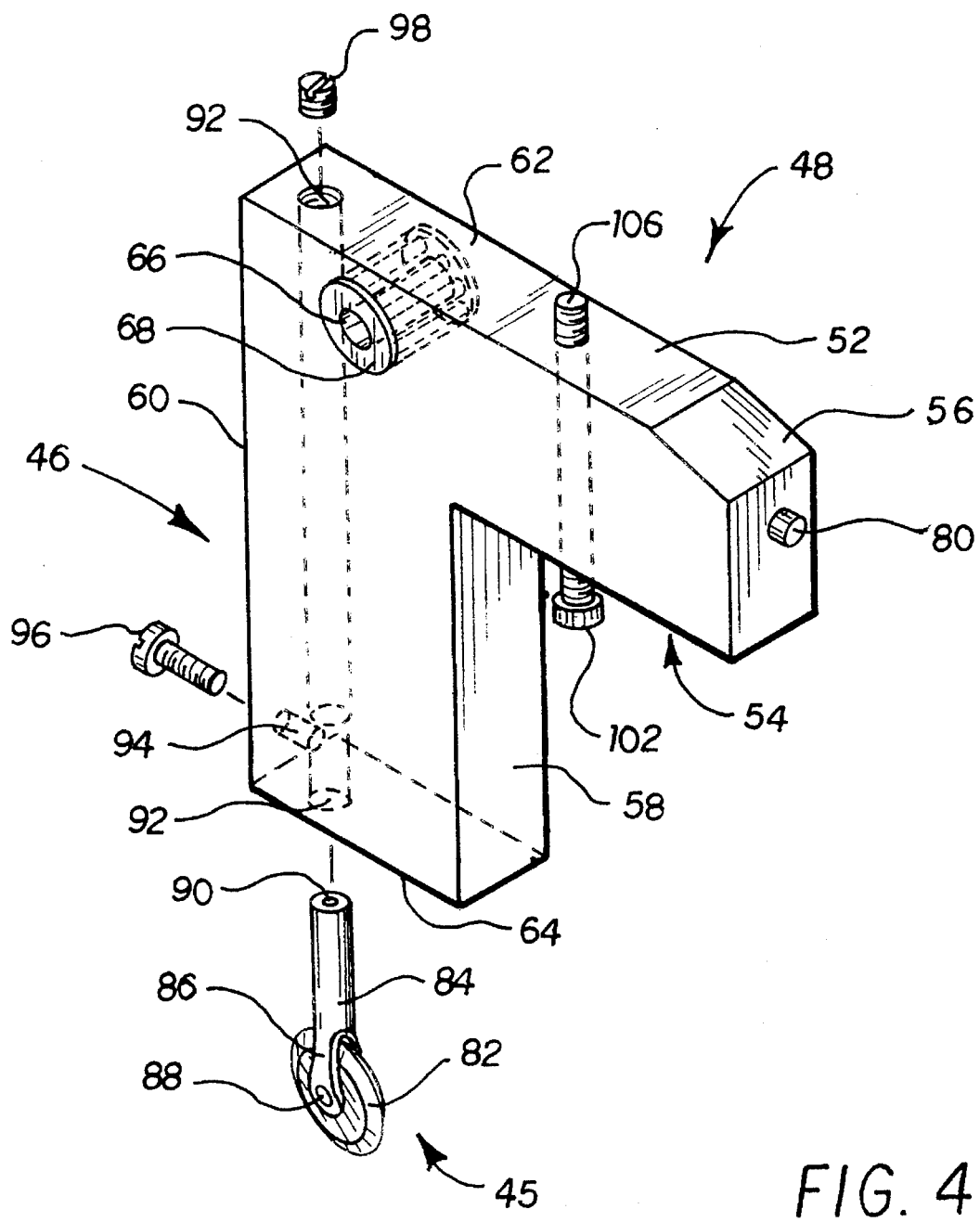
FIG. 4 is a perspective view of the cutting attachment.

Referring to both FIGS. 2 and 4, the structure of the cutting attachment 38 is detailed. The cutting attachment 38 is generally shaped in the form of an inverted L-shaped block having an elongated section 46 and a top section 48. The top section 48 extends perpendicularly from the elongated section 46. The top section 48 includes a front surface 50, a top surface 52, and a bottom surface 54. The top surface 52 includes a tapered surface 56 which is angled toward the front surface 50. The elongated section 46 includes a first side surface 58, a second side surface 60, a top surface 62, and a bottom surface 64.

The pivot pin 44 passes through an aperture 66 which extends completely through the width of the elongated section 46. A plurality of needle bearings 68 are positioned within aperture 66 to allow the cutting attachment 38 to pivot between the first and the second orientation. Alternatively, any well known bearing type may be used in place of needle bearing 68, including ball bearings or sleeve bearings.

As illustrated in FIG. 2, a spring support plate 70 extends perpendicularly from the slide bar 36. A coil spring 72, having a first end 74 and a second end 76, extends between the spring support plate 70 and the cutting attachment 38. The coil spring 72 is anchored at the first end 74 by a first spring pin 78, mounted on the spring support plate 70, and at the second end 76 by a second spring pin 80, attached to cutting attachment 38. The coil spring 72 biases the cutting attachment 38 to the first orientation. Alternatively, any well known biasing means may be used to bias the cutting attachment 38 to the first orientation, including winding a torsion spring around the pivot pin 44.

Referring again to FIG. 4, the glass cutter 45 is shown in detail. The glass cutter 45 includes a hardened cutting wheel 82 and a tubular, elongated stem 84. The tubular, elongated stem 84 includes two parallel extensions 86. The cutting wheel 82 is supported by an axle 88 extending between the two extensions 86. The cutting wheel 82 is rotatable about the axle 88. An aperture 90 extends along the length of the stem 84.

An oil reservoir 92, for holding a supply of cutting oil, extends through the length of the elongated section 46. The 5 diameter of the oil reservoir 92 is sized to sealingly engage the stem 84 of the glass cutter 45 in a tight friction fit such that a seal is formed between the outer surface of the stem 84 and the inner surface of the oil reservoir 92. Thus, oil is prevented from leaking around the stem 84. Oil from the oil reservoir 90 seeps through the aperture 90 in the stem 84 to the cutting wheel 82 thus, providing lubrication for the cutting wheel 82.

A threaded opening 94 is provided in the second side 60 of the elongated section 46. The threaded opening 94 communicates with the oil reservoir 92. A set screw 96 is threaded through opening 94 to engage the outside surface of stem 84 and provides additional support for holding the stem 84 within the oil reservoir 92. A removable threaded cap 98 is provided at the top surface 62 of the elongated section 46 to allow filling of the oil reservoir 92.

Referring again to both FIG. 2 and FIG. 4, a stop plate 100 and an adjustment screw 102 are provided to allow adjustment of the cutting depth of the glass cutter 45. The stop plate 100 extends perpendicularly from the slide bar 36. The adjustment screw 102 threadingly engages a threaded aperture 104 extending through the top section 48 of the cutting attachment 38. A first end 106 of the adjustment screw 102 engages the stop plate 100. When the cutting attachment 38 is in the first orientation, the adjustment screw 102 sets the minimum height of the cutting wheel 82 relative to the plane defined by the upper most surfaces of the rollers supporting the glass workpiece 12. (The rollers are described in detail below). Turning adjustment screw 102 in a clockwise direction increases the gap between top surface 52 and stop plate 100. This causes the cutting attachment 38 to pivot in a clockwise direction in the view shown in FIG. 2, thereby raising the cutting wheel 82 to accommodate thicker pieces of glass. Turning adjustment screw 102 in a counter-clockwise direction decreases the gap between the top surface 52 and the stop plate 100. This causes the cutting attachment 38 to pivot in a counter-clockwise direction in the view shown in FIG. 2, thereby lowering the cutting wheel 82 to accommodate thinner pieces of glass.

Referring again to FIG. 1., the cutter assembly 18 is also provided with drive means 150 and a cam lobe 152. The drive means 150 includes a motor 154 having a rotating first pulley 156, a second pulley 158 connected by a belt 160 to the first pulley 156, a drive rod 162 connected to the second pulley 158, and a drive arm 164 linking the drive rod 162 to the slide bar 36. Preferably, motor 154 is an electric motor.

Figure 3A:
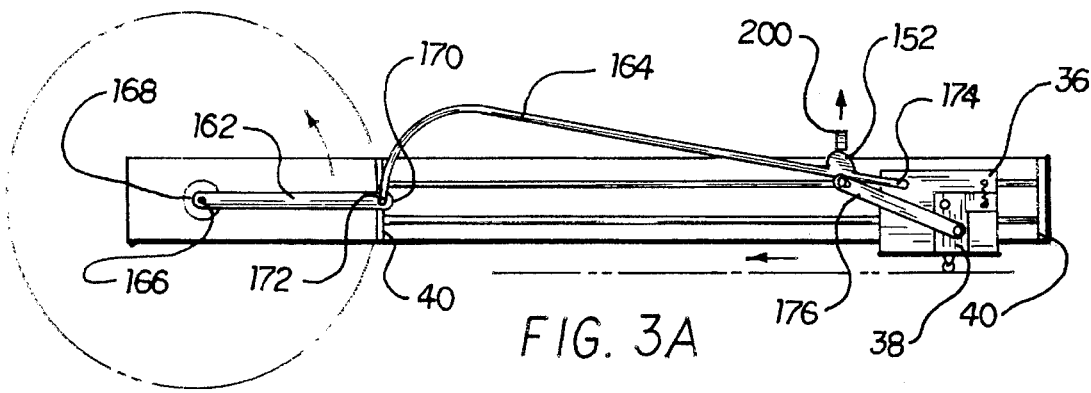
FIG. 3A is a side elevational view of the cutter assembly of the present invention, showing the slide bar in transition between the first direction and the second direction, the cutting attachment positioned in the first orientation, and the cam engaging the rocker arm of the breaking mechanism.
Figure 3B:
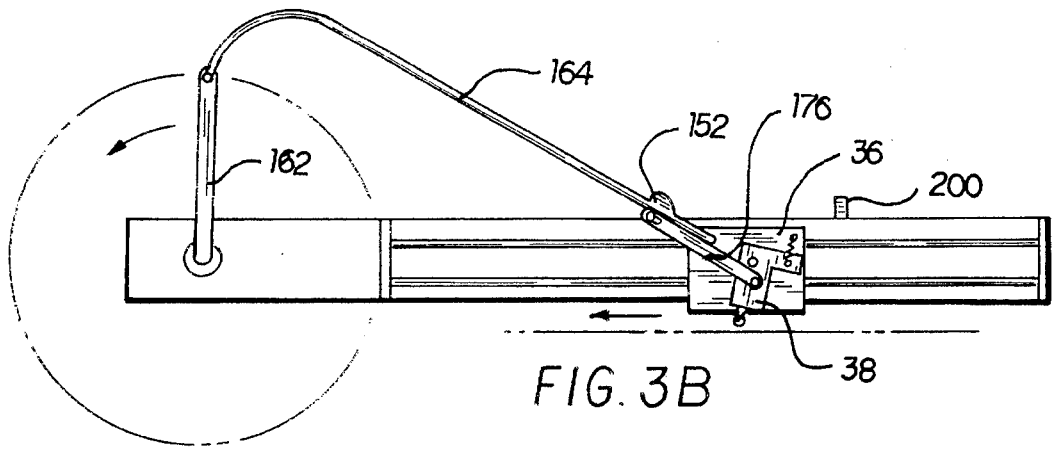
FIG. 3B is a side elevational view of the cutter assembly of the present invention, showing the slide bar moving in the second direction and the cutting attachment positioned in the second orientation.
Figure 3C:
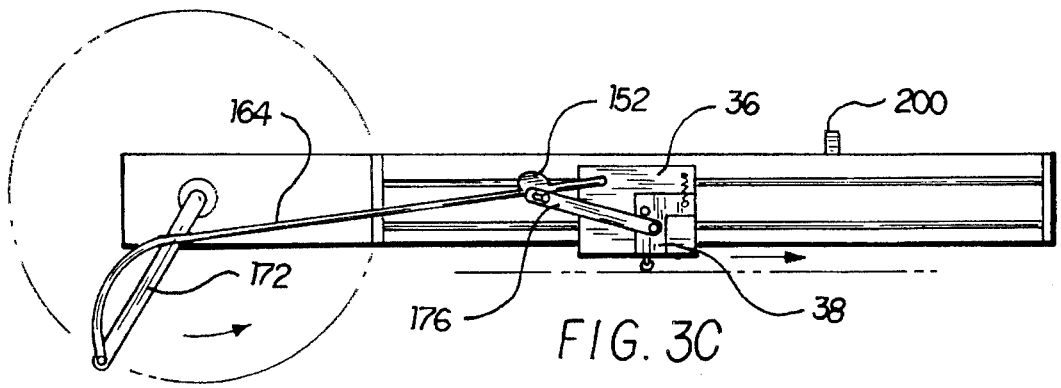
FIG. 3C is a side elevational view of the cutter assembly of the present invention, showing the slide bar moving in the first direction and the cutting attachment positioned in the first orientation.

The second pulley 158 includes an axle 166 which extends through the cross beam 30. As illustrated in FIGS. 3A–3C, the drive rod 162 includes a first end 168 connected to the second pulley 158 via axle 166 and a second end 170 pivotally connected to an arcuate first end 172 of the drive arm 164. Rotation of the second pulley 158 causes the second end 170 of the drive rod 162 to rotate about the first end 168 of the drive rod 162. A second end 174 of the drive arm 164 is pivotally connected to the slide bar 36 such that rotation of the second end 170 of the drive rod 162 about the first end 168 of the drive rod 162 causes the drive arm 164 to slide the slide bar 36 in the first direction and the second direction.

The drive means 150 also includes a link 176 connecting the drive arm 164 to the cutting attachment 38. The link 176 includes a slot 178 having a first end 180 and a second end 182. The drive arm 164 includes a pin 184 sized to engage the slot 178. The pin 184 engages the first end 180 of the slot 178 when the slide bar 36 slides in the first direction, thereby causing the cutting attachment 38 to pivot to the first orientation. The pin 184 engages the second end 182 of the slot 178 when the slide bar 36 slides in the second direction, thereby causing the cutting attachment 38 to pivot to the second orientation.

The drive rod 162 acts in a manner similar to the crank throw of a piston engine. Therefore, some of the same terminology used in the context of a reciprocating engine is used herein to simplify the description of the operation of the cutter assembly 18. Referring to FIG. 3A, the drive rod 162 is shown in the top dead center position. At top dead center the drive rod 162 is in a substantially horizontal position with the second end 170 being in a position closest to the support plates 40. When the drive rod 162 is rotated 180 degrees past top dead center the drive rod 162 is in the bottom dead center position. At top dead center, the drive rod 162 causes the slide bar 36 to reverse direction and begin traveling in the second direction.

In FIG. 3B, the drive rod 162 is shown rotated 90 degrees past Top dead center, causing the slide bar 36 to slide in the second direction. The cutting attachment 38 is shown to be pivoted to the second orientation by the link 176. In FIG. 3C, the drive rod 162 is shown rotated approximately 50 degrees past bottom dead center, causing the slide bar 36 to slide in the first direction. The cutting attachment is shown pivoted to the first orientation by the link 176 and the spring 72.

The cam lobe 152 is positioned on the top surface of the drive arm 164 proximate the second end 174 of the drive arm 164. The cam lobe 152 includes a convex, curving bearing surface 186. The cam lobe 152 is positioned to engage the breaking mechanism 20 as the slide arm 36 slides in the second direction, as described in more detail below.

Details of the breaking mechanism 20 are shown in FIG. 2. The breaking mechanism 20 includes a rocker arm 200, a push rod 202, and a breaker foot 204. A support plate 206 projects from the cross beam 30. A pivot pin 208 extends perpendicularly from the support plate 206 to engage a centrally located aperture (not shown) in the rocker arm 200. The rocker arm 200 is pivotable about the pivot pin 208 between a first position and a second position. Alternatively, a second support plate 207 may be mounted on the cross beam 30 to provide additional support for the rocker arm 200, as shown in FIG. 1. The rocker arm 200 includes a first end 210, engagable by the cam lobe 152, and a second end 212 to which a first end 214 of the push rod 202 is attached. To prevent wear from the impact of the cam lobe 152, a first high-impact plastic bumper 216 is secured to the bottom surface of the first end 210 of the rocker arm 200. The breaker foot 204 comprises a circular disk 218 having a second high-impact plastic bumper 220 attached thereto to prevent wear on the disk 218. Preferably, the first bumper 216 and the second bumper 220 are attached by means of screws, or other similar fastening means, such that the bumpers may be easily replaced when worn.

In the first position, the rocker arm 200 pivots clockwise as seen in FIG. 2, causing the breaker foot 204 to impact the glass workpiece 12. When the slide bar 36 slides in the second direction, the cam lobe 152 engages the first end 210 of the rocker arm 200 causing the rocker arm to pivot to the first position. The impact of the breaker foot 204 on the glass workpiece 12 cause complete separation of the glass workpiece 12 into a first glass section and a second glass section. In the second position, the rocker arm 200 pivots counter-clockwise as seen in FIG. 2, raising the breaker foot 204 from contact with glass workpiece 12. Preferably, the rocker arm 200 is biased to the second position.

The glass cutting apparatus 10 is provided with a feed assembly 300 for continuously conveying the glass workpiece 12 along a path beneath the cutter assembly 18 and for supporting the glass workpiece 12 at the cutter assembly 12, as shown in FIG. 1. In addition, the glass cutting apparatus 10 is provided with an output assembly 302 for continuously conveying glass sections 14 of the glass workpiece 12 away from the cutter assembly 18 after the glass sections 14 are completely separated from the glass workpiece 12 by the breaking mechanism 20.

Referring to FIG. 1, details of the feed assembly 300 and the output assembly 302 are shown. The feed assembly 300 includes three parallel axles 304 rotatably mounted to the frame 16, three feed rolls 306 for supporting the glass workpiece 12, and a first motor 308 for rotating the three axles 304. Each of the axles 304 extend between the two parallel lateral support beams 28 proximate the input 32 of the cutter assembly 18. Preferably, the axles are supported by bearings within the lateral support beams 28. Such bearings are conventional and are not shown herein. The feed roll 306 are fitted over each of the axles 304 and rotate with the axles 304. An axle sprocket 310 is attached to the end of each of the axles 304. The first motor 308 includes a rotatable motor gear 312 connected by a series of chains 314 to each of the axle gears 310. Rotation of the motor gear 312 by the first motor 308 thereby causes rotation of each of the axle sprockets 310, as well as the axles 304 and feed rolls 306. Rotation of the feed rolls 306 continuously conveys the glass workpiece along a path beneath the cutter assembly 18.

The feed assembly 300 also includes a plurality of horizontal support rollers 316 for providing horizontal support to the glass workpiece 12 as the workpiece is conveyed beneath the cutter assembly 18 by the feed rolls 306. The rollers 316 are positioned on a series of parallel rods 318 fixed between the two lateral support beams 28. Each of the rollers 316 is free to rotate relative a respective one of the rods 318. The top surface of the rollers 316 and the top surface of the feed rolls 306 form a horizontal plane for providing horizontal support for the glass workpiece 12.

Side rollers 320 are provided along the edge of the lateral support beams 28. An adjustable tension wheel 322 is positioned opposite the side rollers 320. The side rollers 320 and the tension wheel 322 engage opposing side edges of the glass workpiece 12 and prevent lateral shifting of the workpiece as it is conveyed beneath the cutter assembly 18. Tension wheel 322 is adjustable to accommodate glass workpieces having varying widths.

A pressure roll 324 supported by an L-shaped member 326 is provided to prevent the glass workpiece 12 from rising off the feed rolls 306 as it is conveyed beneath the cutter assembly 18. The L-shaped member includes an horizontal limb 328 and a second limb 330 perpendicular to the horizontal limb 328. The pressure roll 324 is configured to rotate about the horizontal limb 328 of the L-shaped member 326. The L-shaped member 326 is pivotally attached to a lateral support beam 28 and pivots between an engaged and a disengaged position. The L-shaped member 326 pivots about an axis which is parallel to its horizontal limb 328 and passes through the end of the second limb 330 distal from the joint of the horizontal limb 328 and the second limb 330. In the disengaged positioned, the pressure roll 324 is spaced away from the glass workpiece 12. In the engaged position, the pressure roll 324 engages the top surface of the glass workpiece 12 thereby imparting a normal force on the workpiece that prevents the workpiece from rising off the feed rolls 306.

The output assembly 302 includes a drive axle 350, a drive roller 352 rotatably mounted on the drive axle 350, a conveyor belt 354 rotated by the drive roller 352, and a second roller 356. The drive axle 350 includes a sprocket wheel 358 connected by a chain 360 to one of the axle sprockets 310 Rotation of the sprocket wheel 358 causes rotation of the drive axle 350 and the drive roller 352. The diameter of the sprocket wheel 358 is twice the diameter of the axle gear 310. Thus, the sprocket wheel 358, as well as the drive roller 352 and the conveyor belt 354, rotate at half the speed of the axle gears 310 and the feed rolls 306. The conveyor belt 354 extends from around the drive roller 352 to the second roller 356 in a continuous loop to support the glass sections 14 of the glass workpiece 12 after the glass sections 14 are completely separated from the glass workpiece 12 by the breaking mechanism 20. Rotation of the conveyor belt 354 continuously conveys the glass sections 14 from the cutter assembly 18. Preferably, the drive roller 352 is positioned beneath the cutting attachment 38. Thus, a portion of the conveyor belt 354 is positioned directly beneath the beaker foot 204 of the breaking mechanism 20 to receive the glass sections 14 after impact with the breaker foot 204. Even more preferably, conveyor belt 354 is provided with a cushioned surface to reduce the impact of the cut glass sections 14 on the conveyor belt 354.

Referring to FIG. 1, a stop mechanism 400 for stopping the glass workpiece 12 after the workpiece has been conveyed by the feed assembly 300 a distance beneath the cutter assembly 18 is provided for attachment to the cutter assembly 18. The stop mechanism 400 includes two parallel support rods 402 mounted to the cross beam 30. The support rods 402 extend perpendicularly from the cross beam 30 over the conveyor belt 354. A rectangular stop plate 404 is suspended between the support rods 354 by a cross member 406. Cross member 406 includes a first circular collar 408 and a second circular collar 410 connected to the cross member 406 at opposing ends of the member. The first circular collar 408 and the second circular collar 410 are slidable along the length of the support rods 402. Preferably, locking screws (not shown) are provided to allow the collars 408, 410 to be selectively fastened to and released from the support rods 402.

As the glass workpiece 12 is conveyed beneath the cutter assembly 18 by the feed assembly 300, the front edge of the glass workpiece 12 contacts the stop plate 404. The stop plate 404 holds the glass workpiece 12 in a stationary position beneath the cutter assembly 18 as the cutting attachment 38, together with the slide bar 36, slides in the first direction and the glass cutter 45 cuts the glass workpiece 12. Sliding the stop plate 404 along the length of the support rods 402 permits the glass cutting apparatus 10 to selectively cut glass sections of varying lengths.

In operation, the glass workpiece 12 is positioned on and supported by the feed rolls 306 and the horizontal support rollers 316 of the feed assembly 300. The feed rolls 306 rotate to continuously convey the glass workpiece beneath the cutter assembly 18. The front edge of the glass workpiece 12 contacts the stop plate 404 to stop the glass workpiece 12 beneath the cutter assembly 18.

While the glass workpiece is stopped by the stop plate 404, the slide bar 36, together with the cutting attachment 38, are caused to slide in the first direction by the drive means 150. When sliding in the first direction, the cutting attachment 38 is maintained in the first orientation by link 176 and spring 72 as the glass cutter 45 contacts the glass workpiece 12, thereby cutting the glass workpiece across its entire width. Because the glass workpiece 12 is stopped during the cutting operation, i.e. while the slide bar 36 travels in the first direction the resultant cut in the workpiece is parallel to the front edge of the glass workpiece 12.

The slide bar 36, together with the cutting attachment 38, reverses direction and begins to slide in the second direction when the drive rod 162 rotates to the top dead center position. Once travel begins in the second direction, the cam lobe 152 engages the rocker arm 200 to pivot the rocker arm 200 to the first position. The breaker foot 204 impacts the glass workpiece 12 between the resultant cut and the front edge of the glass workpiece 12. The impact completely separates the glass workpiece and the cut glass section 14 drops to the conveyor belt 354. The conveyor belt 354 then conveys the glass section away from the cutter assembly 18.

Once the glass workpiece 12 is cut, a new front edge is formed on the glass workpiece 12 where the cut occurred. The glass workpiece 12 is advanced by the feed rolls 306 until the new front edge contacts the stop plate 406. After the glass workpiece 12 is completely stopped, the drive rod 162 rotates through the bottom dead center position, thus reversing the direction of travel of the slide bar 36 to the first position and repeating the described cutting operation. Thus the glass workpiece 12 is advanced only when the slide bar 36 travels in the second direction.

One skilled in the art will appreciate that multiple glass workpieces may be aligned side-by-side on the feed assembly 300, thus multiple glass sections having varying widths may be simultaneously cut by the glass cutting apparatus 10.

The glass cutting apparatus 10 permits the cutting of a glass workpiece 12 into multiple uniform glass sections 14 having less than 0.01 inches variation in their dimension formed by the cutting operation. In the most preferred configuration, this variation is less than 0.005 inches. In addition, the glass cutting apparatus 10 can achieve a cutting rate of 2000 glass sections per hour for glass sections having a length of 8 inches or less. For glass sections of greater than 8 inches, a cutting rate of 1500 per hour.

It is to be understood that the present invention is not limited to the sole embodiment described above, but encompasses any and all embodiments within the scope of the following claims.

I claim:

1. A glass cutting apparatus comprising:

a frame;

a cutter assembly supported by said frame, said cutter assembly including:

an input for receiving a glass workpiece, a guide means mounted on said frame, a cutting attachment slidably supported by said guide means, said cutting attachment being slidable on said guide means, said cutting attachment being in a first orientation when sliding in a first direction and a second orientation when sliding in a second direction, said cutting attachment including a glass cutter, said glass cutter engaging the glass workpiece when said cutting attachment is in said first orientation and said glass cutter being spaced from the glass workpiece when said cutting attachment is in said second orientation, whereby said glass cutter cuts the glass workpiece when said cutting attachment slides in said first direction, a drive means for sliding said cutting attachment, and a cam mounted on said drive means; and a breaking mechanism movable between a first position and a second position, said breaking mechanism being forced into said first position by said cam as said cutting attachment slides in said second direction, said breaking mechanism impacting the glass workpiece when in said first position whereby complete separation of said glass workpiece into a first glass section and a second glass section is effected.

2. The glass cutting apparatus according to claim 1, further including a feed assembly communicating with said input of said cutter assembly, said feed assembly continuously conveying the glass workpiece along a path beneath said cutter assembly and supporting the glass workpiece at said cutter assembly.

3. The glass cutting apparatus according to claim 2, wherein said feed assembly includes:

an axle mounted to said frame, a feed roll for supporting the glass workpiece, said feed roll being rotatably attached to said axle, and a first motor for rotating said feed axle, whereby rotation of said feed roll continuously conveys the glass workpiece beneath said cutter assembly.

4. The glass cutting apparatus according to claim 2, further including a stop mechanism attached to said cutter assembly, said stop mechanism stopping the glass workpiece after the glass workpiece has been conveyed by said feed assembly a predetermined distance beneath said cutter assembly, said stop mechanism holding the glass workpiece in a stationary position beneath said cutter assembly as said cutting attachment slides in said first direction.

5. The glass cutting apparatus according to claim 1, further including output assembly attached to said cutter assembly, said output assembly conveying a glass section of the glass workpiece away from said cutter assembly after the glass section is completely separated from the glass workpiece by said breaking mechanism.

6. A glass cutting apparatus comprising:

a frame;

a cutter assembly supported by said frame, said cutter assembly including:

an input for receiving a glass workpiece, a guide means mounted on said frame, a slide bar slidably supported by said guide means, said slide bar being slidable on said guide means in a first direction and a second direction, a cutting attachment pivotally connected to said slide bar, said cutting attachment pivoting between a first orientation and a second orientation, said cutting attachment being in said first orientation when said slide bar slides in said first direction and said cutting attachment being in said second orientation when said slide bar slides in said second direction, said cutting attachment including a glass cutter, said glass cutter engaging the glass workpiece when said cutting attachment is in said first orientation and said glass cutter being spaced from the glass workpiece when said cutting attachment is in said second orientation, whereby said glass cutter cuts the glass workpiece when said slide bar slides in said first direction, a drive means for sliding said slide bar, and a cam mounted on said drive means; and a breaking mechanism movable between a first position and a second position, said breaking mechanism being forced into said first position by said cam as said slide bar slides in said second direction, said breaking mechanism impacting the glass workpiece when in said first position whereby complete separation of said glass workpiece into a first glass section and a second glass section is effected.

7. The glass cutting apparatus according to claim 6, wherein said drive means includes:

a motor having a rotating first pulley, a second pulley connected by a belt to said first pulley, said second pulley rotating in response to rotation of said first pulley, a drive rod having a first end and a second end, said first end of said drive rod being connected to said second pulley such that rotation of said second pulley causes rotation of said second end of said drive rod about said first end of said drive rod, a drive arm having a first end and a second end, said first end of said drive arm being pivotally connected to said second end of said drive rod, said second end of said drive arm being pivotally connected to said slide bar, whereby rotation of said second end of said drive rod causes said drive arm to slide said slide bar in said first direction and said second direction.

8. The glass cutting apparatus according to claim 7, wherein said drive means further includes a link connecting said drive arm to said cutting attachment, said link causing said cutting attachment to pivot to said first orientation when said slide bar moves in said first direction and said link causing said cutting attachment to pivot to said second orientation when said slide bar moves in said second direction.

9. The glass cutting apparatus according to claim 8, wherein said link includes a slot having a first end and a second end an said drive arm includes a pin sized to engage said slot, said pin engaging said first end of said slot when said slide bar slides in said first direction, said pin engaging said second end of said slot when said slide bar slides in said first direction.

10. The glass cutting apparatus according to claim 9, further including a biasing means to bias said cutting attachment in the second orientation.

11. The glass cutting apparatus according to claim 6, wherein said breaking mechanism comprises:

a rocker arm having a first end and a second end, said first end engagable by said cam, said rocker arm being pivotable by said cam between said first position and said second position, a push rod having a first end and a second end, said push rod extending from said second end of said rocker arm, and a breaker foot attached to said second end of said push rod, said breaker foot impacting the glass workpiece when said rocker arm is pivoted to said first position whereby complete separation of said glass workpiece into a first glass section and a second glass section is effected.

12. The glass cutting apparatus according to claim 6, wherein said guide means includes two parallel guide rods.

13. The glass cutting apparatus according to claim 12, wherein said slide bar is in the form of a rectangular block, said slide bar having two parallel apertures formed completely therethrough, each of said apertures being sized to engage a respective one of said guide rods.

14. The glass cutting apparatus according to claim 6, further including a feed assembly communicating with said input of said cutter assembly, said feed assembly continuously conveying the glass workpiece along a path beneath said cutter assembly and supporting the glass workpiece at said cutter assembly.

15. The glass cutting apparatus according to claim 14, wherein said feed assembly includes:

an axle mounted to said frame, a feed roll for supporting the glass workpiece, said feed roll being rotatably attached to said axle, and a first motor for rotating said feed roll at a rotation speed, whereby rotation of said feed roll continuously conveys the glass workpiece beneath said cutter assembly.

16. The glass cutting apparatus according to claim 15, further including an output assembly attached to said cutter assembly, said output assembly conveying a glass section of the glass workpiece away from said cutter assembly after the glass section is completely separated from the glass workpiece by said breaking mechanism.

17. The glass cutting apparatus according to claim 16, wherein said output assembly includes:

a drive axle mounted to said frame, a drive roller rotatably mounted on said drive axle, a conveyor belt for supporting glass sections of the glass workpiece after the glass sections are completely separated from the glass workpiece by said breaking mechanism, said conveyor belt being continuously rotated by said drive roller, and a second motor for rotating said drive roller, whereby continuous rotation of said conveyor belt continuously conveys the glass sections from said cutter assembly.

18. The glass cutting apparatus according to claims 16, wherein said output assembly includes:

a drive axle mounted to said frame, a drive roller rotatably mounted on said drive axle, said first motor rotating said drive roller, and a conveyor belt for supporting glass sections of the glass workpiece after the glass sections are completely separated from the glass workpiece by said breaking mechanism, said conveyor belt being continuously rotated by said drive roller at a rotation speed, whereby continuous rotation of said conveyor belt continuously conveys the glass sections from said cutter assembly.

19. The glass cutting apparatus according to claims 18, wherein said output assembly further includes:

speed reduction means for reducing said rotation speed of said conveyor belt to one-half of the rotation speed of said feed roll.

20. The glass cutting apparatus according to claim 14, further including a stop mechanism attached to said cutter assembly, said stop mechanism stopping the glass workpiece after the glass workpiece has been conveyed by said feed assembly a predetermined distance beneath said cutter assembly, said stop mechanism holding the glass workpiece in a stationary position beneath said cutter assembly as said cutting attachment slides in said first direction.

* * * * *